J. F. SHOEMAKER.
CHECK BOOK HOLDER.
APPLICATION FILED DEC. 27, 1913.
1,108,631.
Patented Aug. 25, 1914
2 SHEETS—SHEET 1.
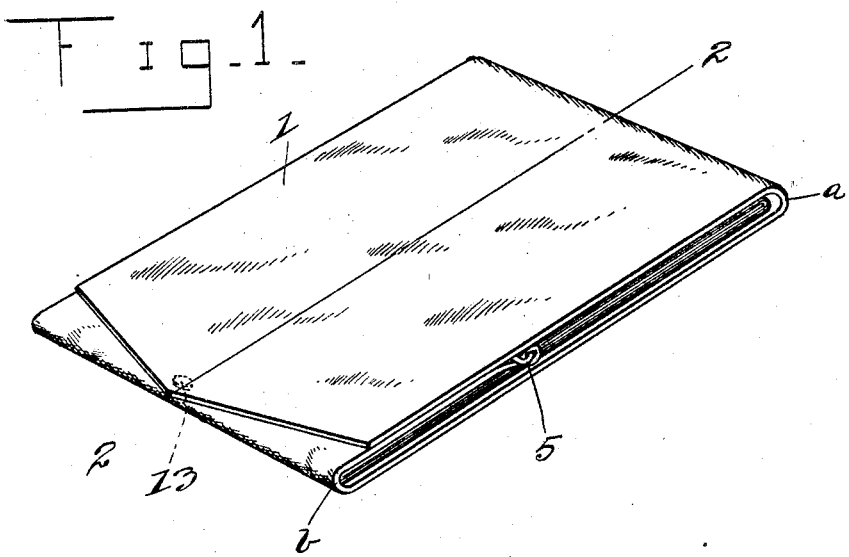
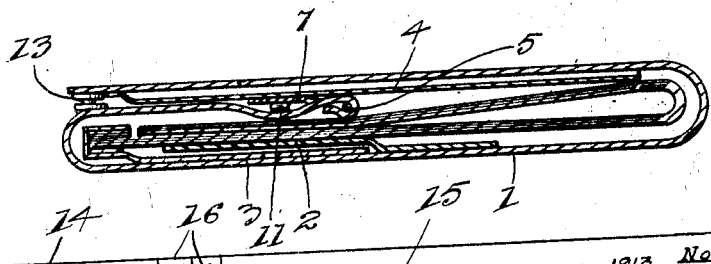
Witnesses
C R Bealle
Inventor
J. F. Shoemaker,
By
Attorney

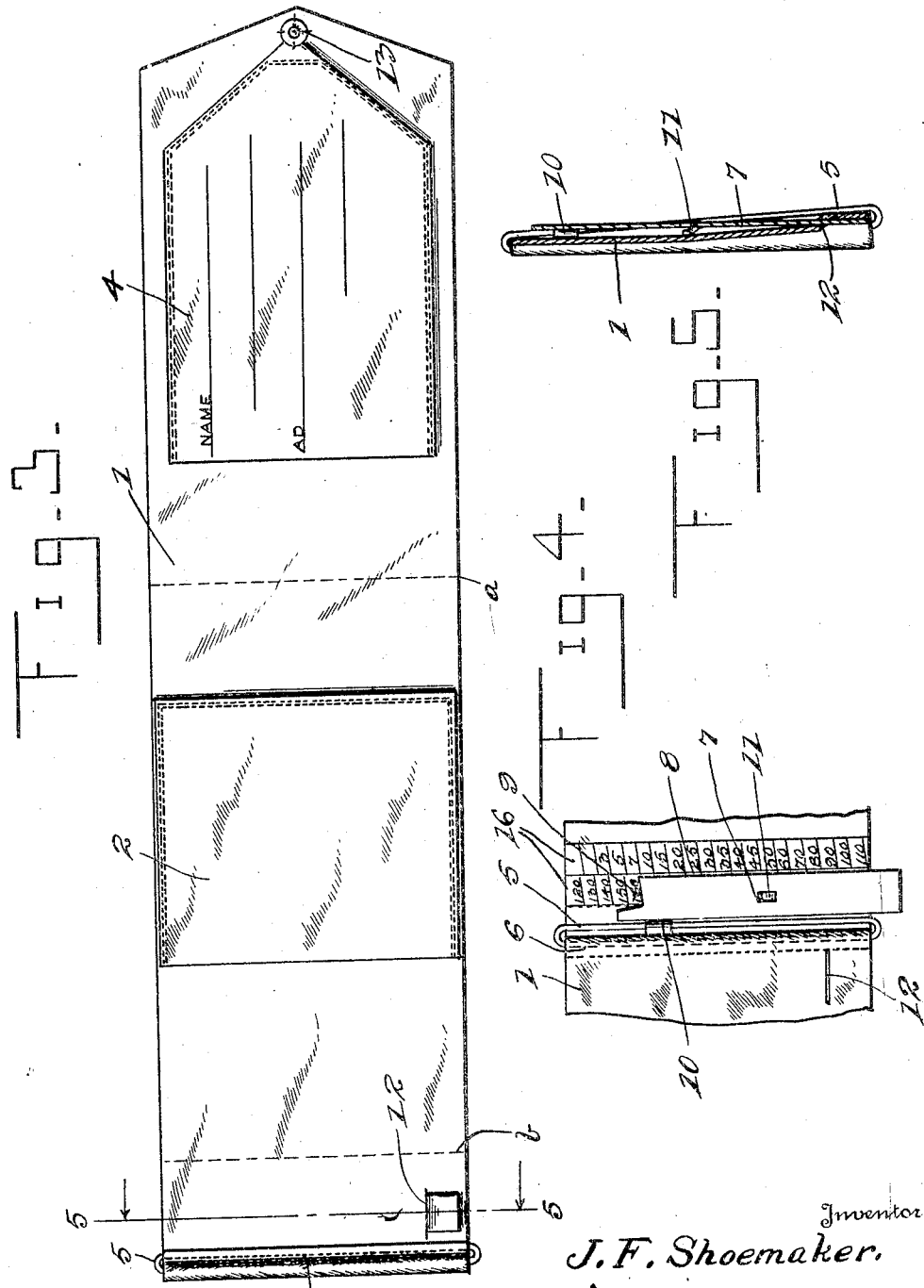

UNITED STATES PATENT OFFICE.

JOHN F. SHOEMAKER, OF BRANDSVILLE, MISSOURI.

CHECK-BOOK HOLDER.

1,108,631.  Specification of Letters Patent.  Patented Aug. 25, 1914.

Application filed December 27, 1913. Serial No. 809,023.

*To all whom it may concern:*

Be it known that I, JOHN F. SHOEMAKER, a citizen of the United States, residing at Brandsville, in the county of Howell and State of Missouri, have invented certain new and useful Improvements in Check-Book Holders; and I do hereby declare the following to be a full, clear, and exact description of the invention, such as will enable others skilled in the art to which it appertains to make and use the same.

This invention relates to check book holders, and has for its principal object to provide a holder for check books having means whereby the check may be severed from the stub to indicate the amount of the check and to also indicate on the stub the amount drawn.

Another object of the invention is to provide a pocket check book holder provided with means for holding a check book, or a number of checks therein, said holder being provided with a pivoted cutter for severing the check from the stub, said check being provided with columns of numbers running from one to one-thousand or more, and said cutter being constructed to be adjustable upon the check stub for severing the check at a point to indicate the amount called for by the face of the check and leaving the stub to indicate the amount drawn.

Still another object of the invention is to provide a check book holder of simple construction having a sliding and pivoted cutter connected thereto in position to be adjusted vertically upon the stub and check to indicate the amount for which the check is drawn, and means being provided for throwing the cutter out of the way and holding it securely in position when not required for use.

The objects and advantages referred to may be attained by means of the construction illustrated in the accompanying drawings, in which, Figure 1 is a perspective view of a check book holder made in accordance with this invention, Fig. 2 is a longitudinal sectional view taken on the line 2—' of Fig. 1, Fig. 3 is a plan view of the check book holder looking at the inside of the same and with the check book removed, Fig. 4 is a detail view showing the manner of severing the check by means of the cutter, Fig. 5 is a detail sectional view showing the cutter folded backward and secured in position when not required for use, and Fig. 6 is a plan view of the check which I desire to use in connection with the check book holder.

Referring to the drawing the numeral 1 designates the check book holder when made for the pocket. It will be understood however, that this check book holder may be of such size as to be used on the desk or in offices and other places. The holder 1 may be formed of leather or other suitable flexible material, and upon the inside thereof is a pocket 2 to receive the back cover member 3 of the check book and this member 3 may be short, or of the required length to be held in place in the pocket 2. Near the outer end of the holder 1 is another pocket 4 designed for the purpose of holding the deposit slip, and upon the inner side of the pocket the name and address of the owner of the check book holder may be given. At the opposite end of the holder 1 a wire guide loop 5 is connected by passing the material of the holder 1 through the loop and securing said loop in place by means of stitches as shown at 6. Mounted to slide on one member of the loop 5 outside the holder 1, is a cutter 7, said cutter having the cutting edges 8 at one side, and the cutting edge 9 at the top. A loop or eye 10 on the cutter 7 is mounted on the wire guide member of the loop 5. A finger hold 11 is cut from the body of the cutter and extended upward to serve as a handle for moving the cutter. When the cutter is not required for use it may be swung upon the pintle point 10 and its end inserted into the slit 12 in the holder 1 as shown more clearly in Figs. 3 and 5.

The check book holder is held in closed position after it is folded on the lines $a$ and $b$, by means of a suitable fastening 13 which may be similar to the ordinary glove fastener, but preferably of smaller size for the pocket type of check book holder. The checks designed to be used with the check book holder are provided between the stub 14 and the check 15 with two or more rows of indicating numerals 16.

When a check has been drawn, the cutter is withdrawn from the slit 12 in the holder and thrown over upon the indicating numerals 16 and adjusted with the upper cutting edge 9 immediately below the amount for which the check is drawn. The check is then severed at this point, thus indicating upon the check itself and upon the stub the amount for which the check is made out A check book made in accordance with this invention is designed more particularly for use by stock men, who draw checks in the open field and usually with a lead pencil. Moreover the check book holder will be found very convenient for traveling men, or others required to draw checks at a moment's notice and at any place. It will be understood, however, that a check book holder made in accordance with this invention may be of sufficient size and of such construction as to be very useful for offices and other places where an ordinary protectograph is not at hand.

What is claimed is:—

1. A check book holder provided with means for holding a check book, and a sliding pivoted cutter supported within the book, and provided with means for severing the checks and for indicating the amount of the face of the check.

2. A check book holder provided with means for holding a check book, therein, the checks of said book having vertical columns of indicating amounts for which the check may be drawn, and a cutter mounted to slide on a guide loop connected to the holder, said cutter being pivotally mounted to the guide and adapted to be swung on the pivot out of the way and held in connection with the holder when not required for use.

3. A check book holder having a pocket for receiving the shortened back cover of the check book, a pocket for deposit slips, a pivoted and sliding cutter for severing the checks from the stub to indicate the amount called for by the face of the checks, and means for holding the check book holder closed.

4. A check book holder provided with a cutter for severing the checks from the stub, a guide loop upon which said cutter is mounted to slide, said cover being pivoted to said guide, and means for holding the cutter out of the way when not required for use.

In testimony whereof I affix my signature in presence of two witnesses.

JOHN F. SHOEMAKER.

Witnesses:
 S. J. Cox,
 M. W. Ellis.